Figure 1:
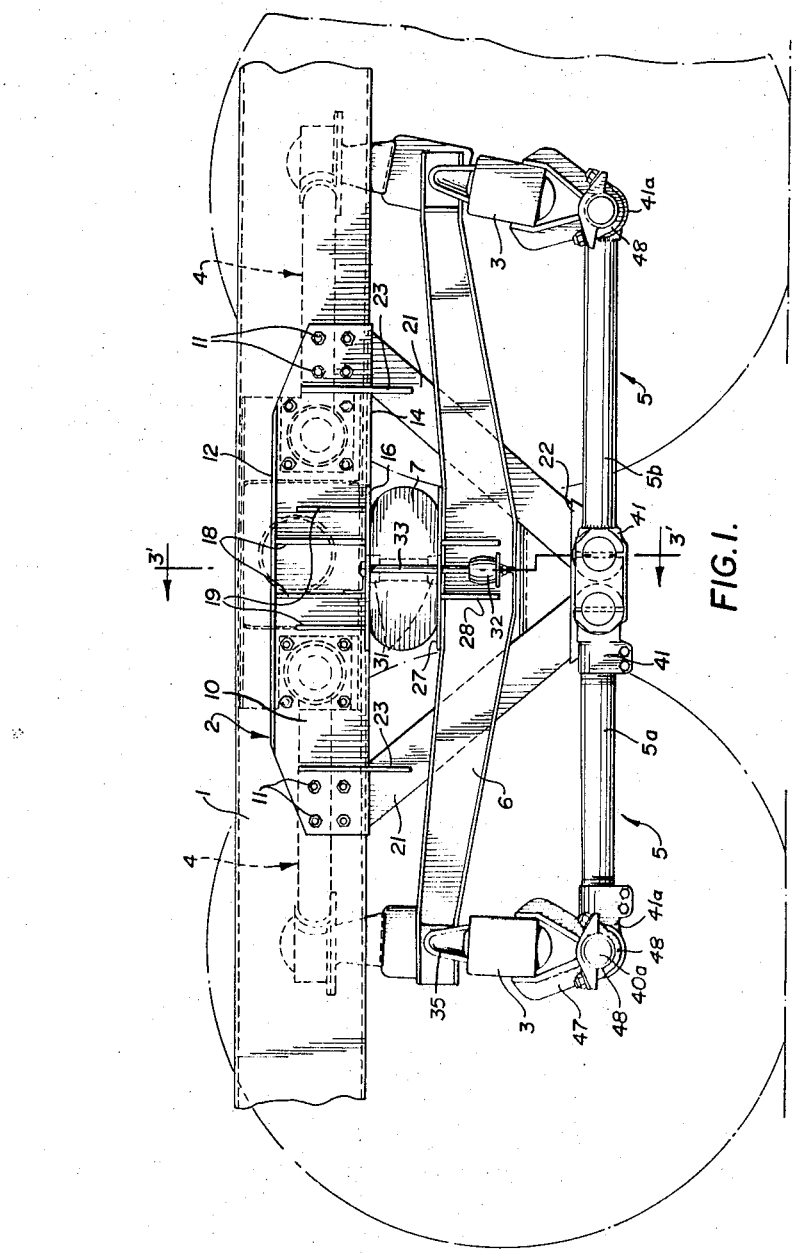

United States Patent [19]
Chalmers

[11] 3,792,871
[45] Feb. 19, 1974

[54] LINKAGE COMPONENT FOR VEHICLE SUSPENSION

[76] Inventor: Wallace G. Chalmers, The Penthouse, 310 Victoria Ave., Westmount, Montreal 215, Quebec, Canada

[22] Filed: June 6, 1972

[21] Appl. No.: 260,223

[30] Foreign Application Priority Data
June 7, 1971 Great Britain...................... 19185/71

[52] U.S. Cl. ........................ 280/104.5 A, 267/63 R
[51] Int. Cl.............................................. B60g 5/04
[58] Field of Search.. 280/104.5 R, 104.5 A, 124 R; 267/3.6, 63 R

[56] References Cited
UNITED STATES PATENTS

| | | | |
|---|---|---|---|
| 3,140,866 | 7/1964 | Zollner............................. | 267/63 R |
| 3,315,979 | 4/1967 | Chalmers...................... | 280/104.5 R |
| 3,147,024 | 9/1964 | Brockman..................... | 280/104.5 R |
| 2,784,980 | 3/1957 | Norrie............................. | 280/104.5 A |

*Primary Examiner*—Philip Goodman
*Attorney, Agent, or Firm*—Cushman, Darby & Cushman

[57] ABSTRACT

A linkage component, particularly, of the wishbone type, for guiding a sprung part of a vehicle suspension system in linear movement relative to an unsprung chassis part. The component has a rigid frame, preferably triangulated, containing three bearing elements, two of which are co-axial bearing pads preferably in the form of oppositely disposed end caps which fit into corresponding sockets in the chassis part, allowing rotation of the component about the axis joining the end caps. The frame supports a third bearing element displaced from this axis and which partially locates the unsprung part of the suspension system. The linkage component in accordance with the invention is easy to install, and has a particularly advantageous bearing pad arrangement in which the bearing pads are easy to replace, and have a long life by reason of a large bearing area. The component in accordance with the invention may be used in association with torque rods for locating the rear axle of a load-carrying vehicle such as a truck or trailer. The specification particularly describes the uses of the component in tandem axle suspension systems, and also describes a novel configuration particularly for a trailer suspension system.

14 Claims, 10 Drawing Figures

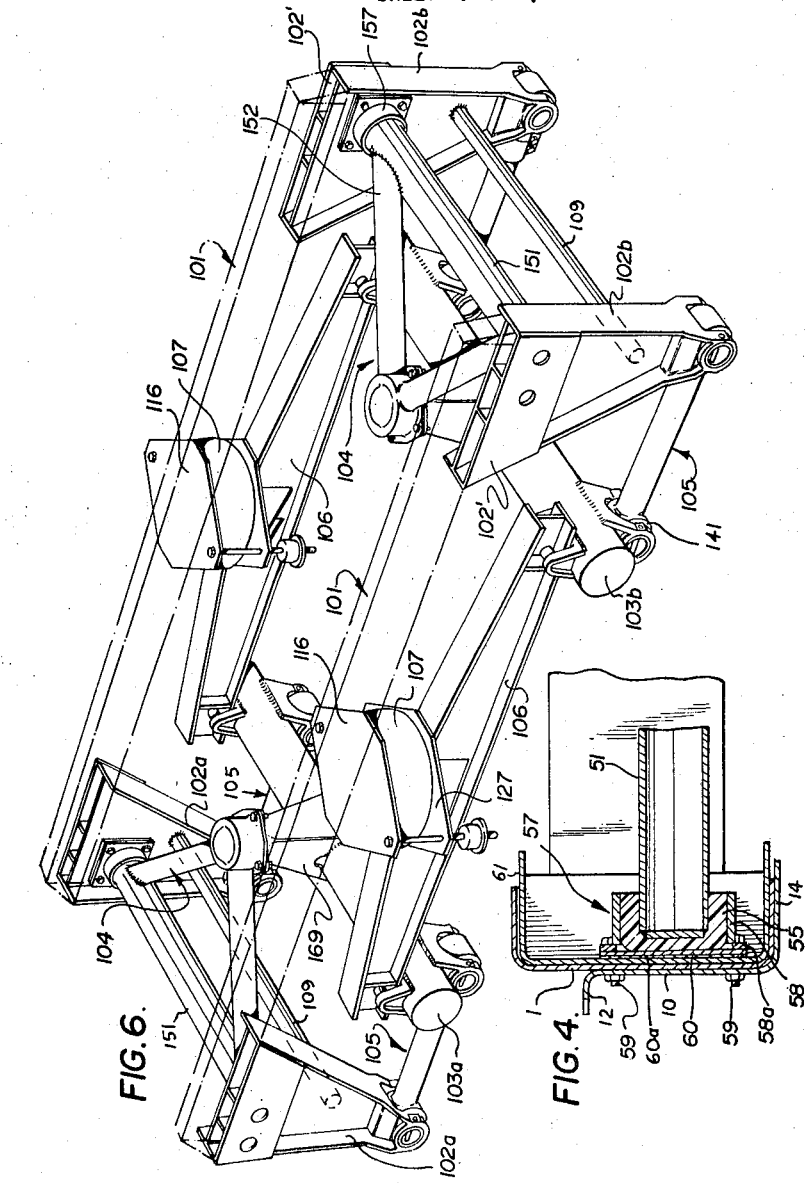

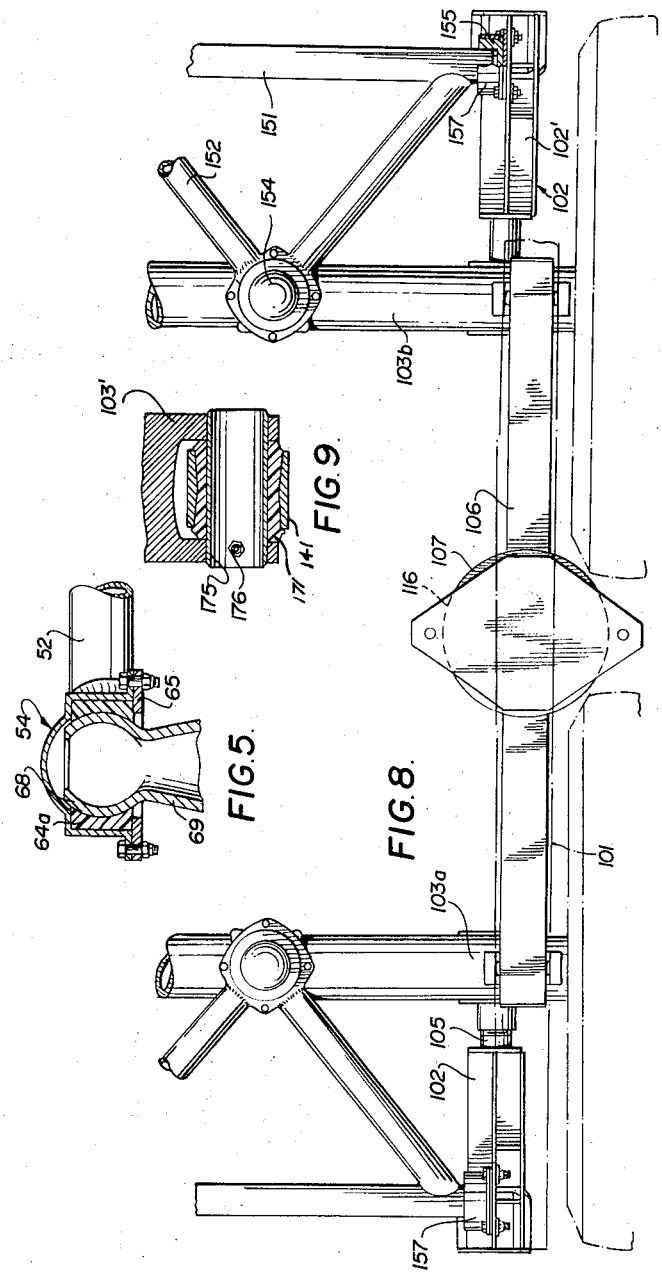

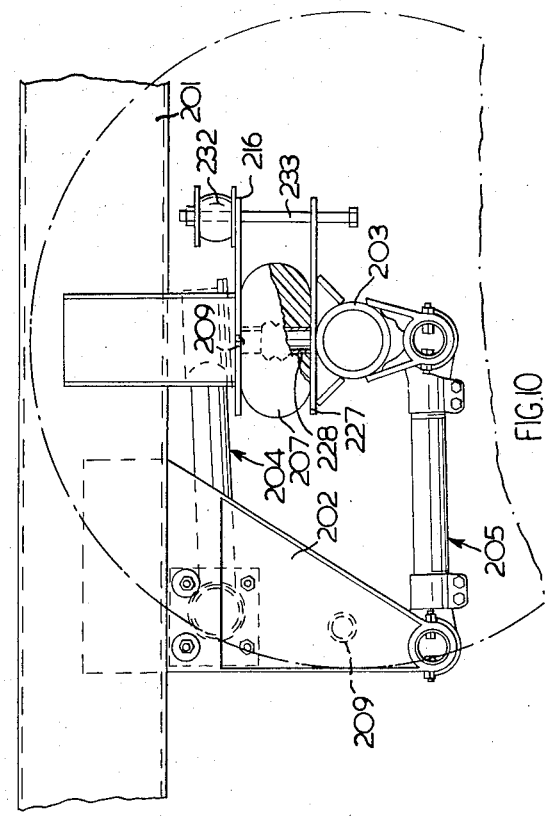

LINKAGE COMPONENT FOR VEHICLE SUSPENSION

The present invention relates to suspension systems for vehicles, and particularly relates to a novel suspension component of the wishbone type. The invention is also concerned with suspension systems incorporating this component, particularly tandem axles suspension systems for the rear axles of heavy vehicles including trucks, trailers, and semi-trailers.

A typical suspension system using wishbone components is shown in my prior U.S. Pat. No. 3,315,979, issued Apr. 25, 1967. This patent shows a tandem axle suspension system in which the chassis load is transmitted to the axles by two walking beams extending longitudinally on each side of the chassis, the ends of these beams resting on and being supported by the outer ends of the two axles. A rubber spring is interposed between the centre of each beam and adjacent chassis parts, and this allows the beams to rock about their centres and to move bodily up and down. In the arrangement described in this patent, the walking beams and springs do not have any locating function, and a torque rod system is used to locate the axles longitudinally and laterally and to resist torque on the axles caused by acceleration and braking. The torque rod system includes upper and lower torque rod means which form a parallelogram type linkage when viewed from the side, so allowing the axles to move vertically with minimum rotation, so that reaction to torsional loads on the axles do not cause these to move up and down. The upper torque rod means for each axle is in the form of a V-shaped assembly which also restrains lateral movements of the axle while allowing this to rock about a longitudinal axis.

The term "torque rods," as used in the art, means links which are attached to the axles in such a manner as to resist the torque applied to the axles when the vehicle accelerates or brakes. The term "axle" refers to the non-rotating cross member which connects the wheels, and means the axle housing in the case where the wheels are driven as in trucks.

The V-shaped assembly of upper torque rod means shown in my prior patent is a component commonly known as a wishbone, and similar components are used in many different suspension systems, including single axle rear suspension systems and front suspension systems. The wishbone component shown in my prior patent comprises a V-shaped assembly of two rods, the inner ends of the rods being welded to a socket part forming a bearing which holds a spigot extending upwardly from the top of the axle. The outer ends of the rods are also provided with eye portions which are fitted within the sides of small brackets held by a chassis cross-member, and these eye portions provide bearings which are rotatable on pins held between the sides of the respective brackets. In this arrangement, the pins allow rotation of the wishbone about the common axis of the pins and the sideways forces transmitted by the two rods in resisting lateral forces on the axle housings are taken by the pins and by the sides of the brackets.

It may be noted that with this arrangement the wishbone assembly is not completely rigid since the outer ends of the rods are not braced, and in fact slight flexibility of the wishbone may be desirable in order for lateral forces on the wishbone to be evenly distributed between the two brackets holding the outer ends of the rods.

This known arrangement of bearings for the outer ends of the rods has drawbacks in that the bearing surfaces provided between the pins and the eye portions are of small area, so that a fair amount of wear occurs, and the manufacture and assembly of these components is also somewhat expensive and time consuming. The present invention provides a component which serves the same general purpose as the wishbone just described, i.e., it guides an unsprung part of a suspension system in linear movement relative to a sprung chassis part, the linear movement of the part directly engaged by the wishbone component being of course the arc of a circle. With the linkage component of this invention, however, the manufacture and assembly of the component is much simplified, and bearing means are provided which have a large bearing area and therefore which have an extremely long life before replacements are needed.

In accordance with the invention a linkage component for guiding an unsprung part of a vehicle suspension system in linear movement relative to a sprung chassis part comprises a rigid frame connecting three spaced apart bearing elements. The bearing elements include two co-axial bearing elements having oppositely facing bearing surfaces, these elements being arranged so as to resist axial thrust and radial forces when located by bearing means of complementary shape and having opposed bearing surfaces spaced a fixed distance apart. The bearing elements also include a third bearing element spaced from an axis joining the co-axial elements, so that the component is capable of being located with its coaxial bearing elements held in opposed bearing means carried by one of the parts, in such manner as to allow angular movement of the component about the axis joining the co-axial elements with concomitant guided movement of another part having further bearing means located by the third bearing element.

Normally, the two bearing means will be attached to a sprung chassis part, and the third bearing element will be used to locate co-acting bearing means carried by an unsprung part of the suspension system. The co-axial bearing elements can generally resist axial thrust in one direction only, and the frame is rigid in the sense that the distance between the bearing elements is firmly fixed for example by bracing means, and no significant distortion of the frame occurs when the frame is subjected to forces which cause axial thrust on the co-axial bearing elements. Thus, the co-axial bearing elements may be pads mounted on co-axial portions of the component and fitting within co-axial sockets. The sockets for the bearing pads will generally be inwardly facing co-axial bearing sockets attached to internal surfaces of chassis members, or brackets attached to chassis parts. The bearing elements or pads themselves are preferably of fairly hard but slightly resilient material, such as polyurethane. The third bearing element will generally be a partly spherical socket, capable of holding a ball member rigidly attached to an unsprung part of the system.

The preferred form of linkage component is thus held for rotation about an axis by the two bearing pads which are seated in opposed bearing sockets. The bearing pads may be of relatively large diameter so giving a bearing area much larger than that obtainable using the known wishbone assemblies of the type described above. Also, assembly of the component is simple, the bearing pads being merely inserted into the sockets, the sockets being then bolted in place.

In a preferred embodiment, the bearing pads are end caps having sockets bonded onto correspondingly shaped end portions of the rigid frame of the component. Such end caps preferably have substantially flat end faces and substantially cylindrical side faces, which resist axial thrust and radial forces respectively.

Preferably also, the linkage component is in the form of a triangulated wishbone, the rigid frame thus comprising a stiff axial elongated member extending along the axis between the bearing pads, the ends of the member carrying the bearing pads, and the frame also comprising two further stiff elongated members each having an inner end connected to the third bearing element and having their outer ends connected to the axial member at spaced apart locations. Conveniently, the axial member is tubular, and the outer ends of the two further stiff elongated members (which may be circular section tubes) are welded to the sides of the axial member.

The wishbone component in accordance with the invention can be used in many different suspension systems. In one system which is described in detail below, the wishbone components are used in a tandem axle suspension system very similar to that described in my prior patent referred to above, and in which both the upper and lower torque rod means (the upper torque rods means being the wishbone components) extend from the axles to support means between the axles. In another arrangement, also described below, the same components are used in a tandem axle suspension system in which the upper and lower torque rod means (the upper torque rod means again being the wishbone components) both extend outwardly from the axles away from the space between the two axles to brackets in front of the front axle and behind the rear axle. This arrangement of upper and lower torque rods is itself believed to be completely novel, and has advantages where the space between the walking beams is limited, since there is no possibility of interference between the walking beams and the torque rod means. Also, this latter arrangement has advantages in ease of assembly, since it makes use of two sub-assemblies each comprising a pair of brackets for attachment to a vehicle chassis part, a pair of lower torque rods each flexibly connected at one end to the lower end of one of the brackets and connectable to the axle at the other end, and upper torque rod means comprising a wishbone in accordance with the invention, held between co-axial sockets bolted to the insides of the same brackets which hold the outer ends of the lower torque rods. This sub-assembly is useful not only for tandem axle suspension systems, but for locating the axles of single axle systems, as will be described.

In addition, wishbone components in accordance with the invention may be used where these extend outwardly from tandem axles away from the space between the axles, lower torque rod means being provided which extend from the axles to supporting frame means or brackets extending downwardly between the axles.

Figure 2:
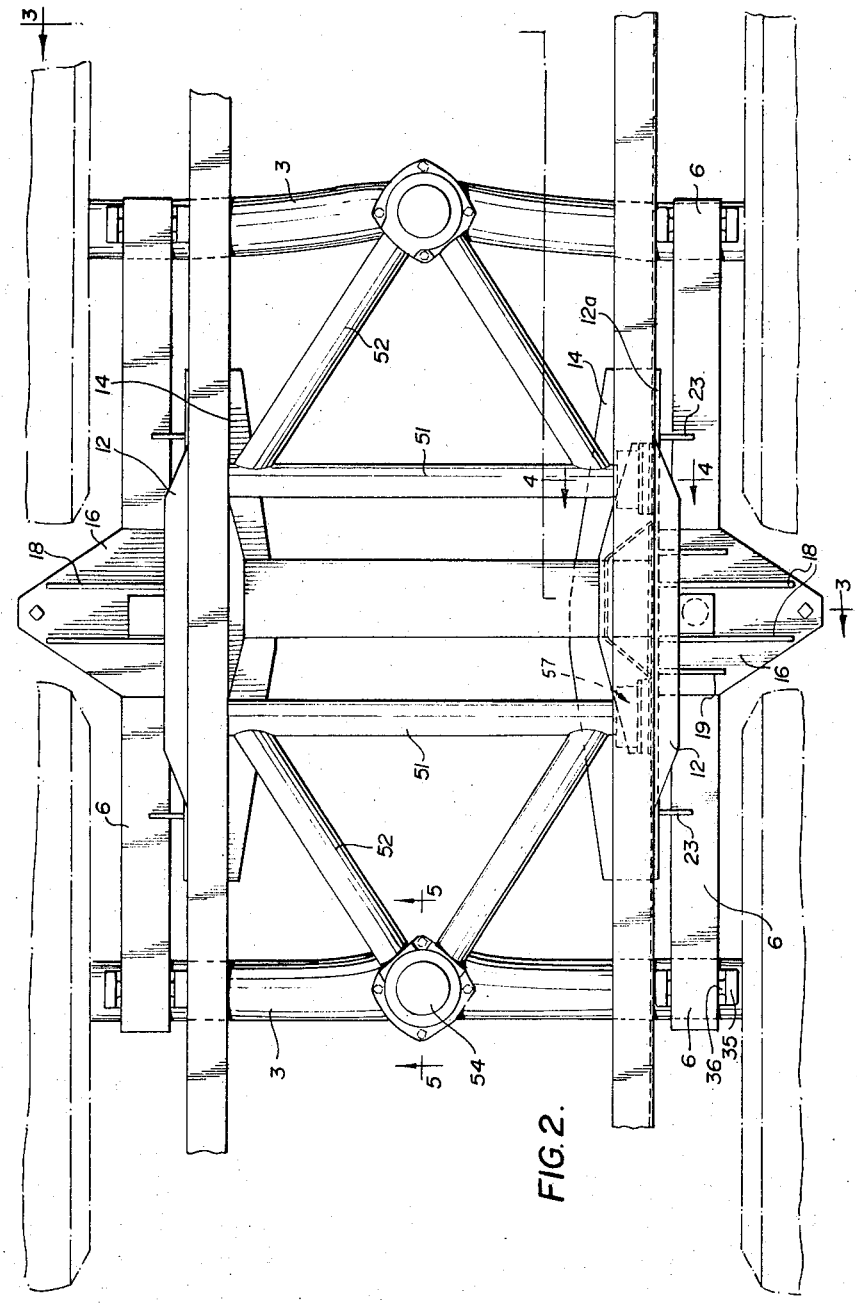
Figure 3:
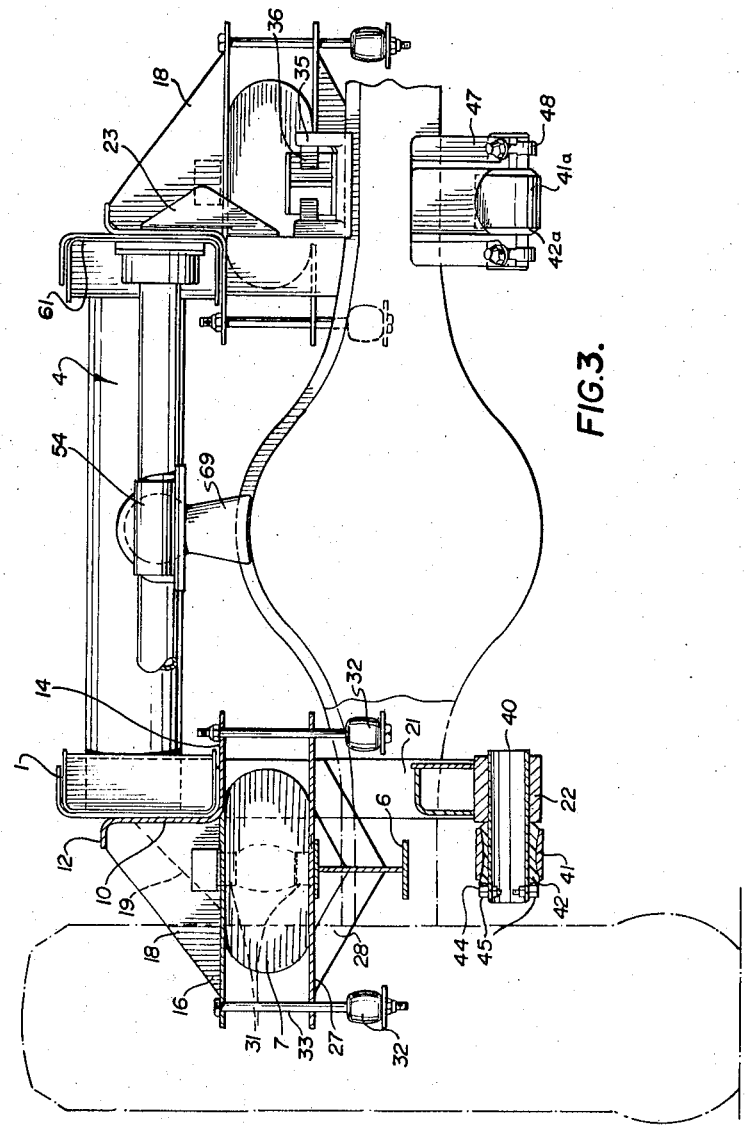
Figure 7:
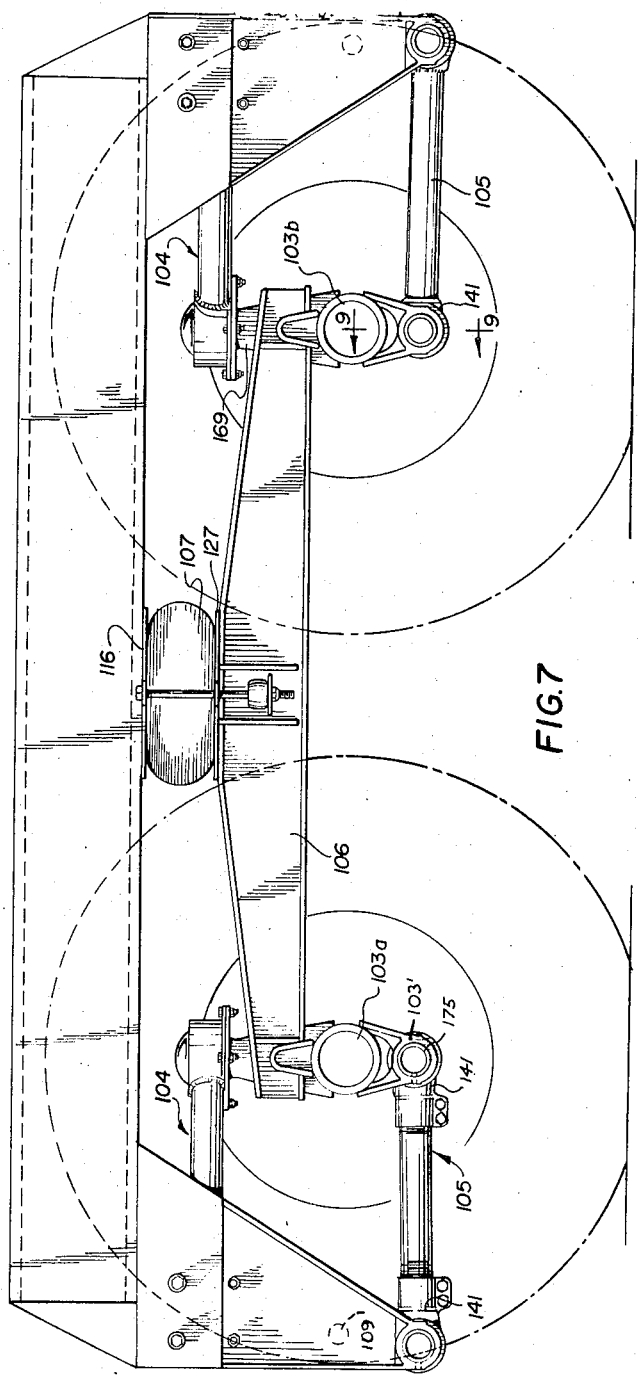

The invention will now be described by way of example with reference to accompanying drawings, in which:

FIG. 1 shows a side elevation of a tandem axle suspension system for trucks, in which the road wheels are shown ghosted, FIG. 2 shows a plan view of the suspension system shown in FIG. 1, FIG. 3 shows a cross-sectional view of the same truck suspension system taken on the line 3—3 of FIG. 2, the left hand side being also a section on line 3'—3' of FIG. 1, FIG. 4 shows an enlarged cross-sectional view taken on the line 4—4 of FIG. 2 and showing the bearing connecting the wishbone component with a chassis mounted socket, FIG. 5 shows an enlarged sectional view of the bearing connecting the wishbone component with the axle housing, taken on the line 5—5 of FIG. 2, FIG. 6, which appears on the same drawing sheet as FIG. 4, shows a perspective view of a trailer suspension, FIG. 7 shows a side elevation of the trailer suspension of FIG. 6, in which the road wheels are shown ghosted, FIG. 8 which, with FIG. 9, appears on the same drawing sheet as FIG.5, shows a partial plan view of the trailer suspension, partially sectioned, FIG. 9 shows an enlarged view of the bearing connecting the lower torque rod to the axle of the trailer suspension, and FIG. 10 shows a side view of a single axle suspension.

Referring to the tandem axle truck suspension shown in FIGS. 1 to 5, these drawings show a truck suspension attached to longitudinal truck chassis members indicated at 1, these members having bolt holes for receiving bolted-on brackets indicated generally at 2, to which brackets the major part of the suspension system is attached. The suspension system comprises essentially two tandem axles 3 positioned transversely across the chassis, the axles being positioned and located by upper torque rod means in the form of wishbone components indicated generally at 4 and lower torque rod means indicated at 5, the suspension system also including equalizing or so-called walking beams 6 extending longitudinally on each side of the chassis these beams being supported at their ends by the axles 3 and floating with respect to the chassis, spring means 7 being interposed between the chassis and the central part of the beams.

The brackets 2 each comprise a Z-shaped steel plate having a vertical web 10 bolted to the chassis member 1 by bolts 11, a narrow top flange 12 extending outwardly from the chassis member, and a wider bottom flange 14 fitting underneath the chassis member. To the base of web 10 is welded an outwardly extending plate 16, forming a continuation of the bottom flange 14, and which is braced by two pairs of gussets 18 and 19. The bracket also includes two box section members 21 which slope downwardly and inwardly from the outer ends of the bottom flange 14, and which have their lower ends adjacent to each other and welded to a block 22. The members 21 thus provide a triangulated support frame means for the block 22, which frame is rigid in the fore and aft direction. Members 21 are braced by gusset plates 23. The block 22 supports the inner ends of the lower torque rods 5, in a manner to be described.

The plate 16 bears against the upper end of the rubber compression spring 7, which is a barrel-shaped block of natural rubber having a central cavity. Rubber compression springs of this type are generally known, and are described in more detail with reference to FIG. 10. Rubber springs of this type have the advantage that they are self-damping so that no extra dampers (or so-called shock absorbers) are required in the system, and such rubber springs also have desirable variable-rate characteristics. However, a combination of steel coil springs and dampers could also be used in the suspension system in place of springs 7, and bellows-type air springs could also be used.

The lower end of spring 7 is supported by a lower plate 27, which is attached to a flat portion of the upper flange of the walking beam 6, at the centre of this beam, the plate being braced by gussets 28. The spring 7 is located in position between the plates 16 and 27 by two short tubular spigots 31 extending inwardly from each plate into the central cavity of the spring. The interior of the lower tubular spigot is vented to atmosphere so that as the spring is successively compressed and expanded air is pumped in and out of the central cavity of the spring through the spigot. This flow of air prevents undesirable heating of the rubber spring, which would otherwise occur due to its energy absorbing characteristics. Rebound stops 32 are provided in the form of two rubber bungs at the lower ends of two rods 33 which pass through apertures in the lower plate 27 and are attached to the upper plate 16, these stops bearing against the lower sides of plate 27 when the spring 7 is at maximum extension.

The walking beams 6 are each of I section having upwardly sloping side portions terminating in short horizontal end portions which are supported slidably on the axles 3. The axles have castings with upstanding lugs 35 carrying inwardly extending spigots 36 which engage the upper surfaces of the lower beam flanges when the axle drops relative to the beam, so maintaining the general position of the beams relative to the axles. However, the beams do not play any part in locating the axles either longitudinally or laterally of the chassis. The spring means 7 are axially compressible and capable of flexure to allow the beams to tilt and rise to follow the vertical movements of the axles.

The lower torque rod means 5 comprises, for each axle, a pair of tubular rods 5a, 5b, each having an inner end flexibly connected to the block 22 and an outer end flexibly connected to one of the axle housings 3. As seen in the left-hand side of FIG. 3, the block 22 has two parallel side-by-side lateral bores in which are fixed outwardly projecting hollow pins 40. The projecting portions of pins 40 have smooth machined surfaces which have a hard chrome finish, and each carry one end of a torque rod 5a, 5b. The inner end of each torque rod 5a, 5b, has an enlarged cast end portion 41 having a transverse bore of convergent/divergent shape. This convergent/divergent bore is cast in the socket portion 42 and requires no machining. In this bore is inserted a resilient polyurethane bushing 42 having an outer surface conforming to the shape of the bore, and having a parallel sided internal bore which is slidable on the pin 40. The co-action between the machined and hard chrome surfaces of the pin 40 and the polyurethane bushing, which bushing is preferably impregnated with molybdenum-disulfide, gives a long wearing bearing which does not require lubrication in service, and the bushing is resilient enough to accommodate slight lateral movements of the axle relative to the cast end portion 41. The end portion 41 of the torque rod is retained on the pin 40 by a washer 44 and two retaining bolts 45.

The outer end of each torque rod 5a, 5b, also has an enlarged cast end portion 41a, having a polyurethane bushing 42a which fits closely on a hollow pin 40a similar to pin 40. The pin 40a is held in a bracket 47 by U-shaped clamps 48 which hold the pin 40a in a semi-cylindrical clevis mount in the bracket 47. These are shown in end view in the right-hand side of FIG. 3. This arrangement allows removal of the torque rods by releasing the clamps 48, allowing the pin 40a to drop from the bracket 47 with the outer end of the torque rod, the inner end of the rod being then slidable off the pin 40 after removal of the retaining bolts 45.

In order to adjust the axle alignment, one of the lower torque rods 5a of each pair is made adjustable in length, by providing screw fitted engagement of the end portions 41 and 41a on the tubular portion of the rod.

The upper torque rod means 4 for each axle housing comprises a wishbone component of the type with which the present invention is mainly concerned. As seen in plan view (FIG. 2), each wishbone component comprises a rigid triangulated frame comprising a stiff elongated member in the form of a cross bar 51 which is of circular section tubing, and has circular plates welded over its ends, and to which are welded two further stiff elongated members 52 in the form of tubes. The outer ends of tubes 52 are spaced apart and are welded to the sides of tube 51 near to its ends, the inner ends of these tubes 52 being close together and welded to a socket bearing member 54, the three members 51 and 52 forming an equilateral triangle.

The ends of cross bar 51 extend beyond the welded joints with the tubes 52, and the ends of this cross bar fit into correspondingly shaped sockets in bearing pads 55, which are in the form of polyurethane caps non-rotatably bonded onto the ends of the cross bar 51. The end caps, which are particularly shown in FIG. 4, have transverse end faces capable of resisting axial thrust in the cross bar 51, and cylindrical surfaces capable of resisting radial forces, when fitted within sockets 57 of complementary shape. The end caps and sockets are co-axial, so that the whole component 4 can rotate about the axis of cross bar 51 when fitted in the sockets. The sockets 57 include a short cylindrical tube 58 having outwardly extending flanges 58a with bolt holes for bolts 59, and the sockets also include end thrust plates 60 fitting underneath the flanges 58a and contacting the ends of the caps 55. The sockets 57, including tubes 58 and end plates 60, are bolted by the bolts 59 to the chassis member 1, with a reinforcing channel shaped insert 61 being interposed between the chassis member 1 and the plate 60. In practice, additional thin shims 60a may be used between the insert 61 and the thrust plate 60, to adjust the separation between the opposing sockets so that there is no undesirable play or free movement of the component 4 in the socket bearings. The internal surfaces of both the tube 58 and the plate 60 are machined surfaces which have a hard chrome finish, and the polyurethane pads 55 are impregnated with molybdenum disulfide. This combination gives bearings which have a large and long lasting bearing area, and which require no lubrication. Also, because the co-axial bearing elements resist axial thrust in only one direction they can be assembled by a simple sliding motion.

The socket bearing member 54, which forms the third bearing member of the wish-bone component, is shown in detail in FIG. 5. This socket member has a domed cap and a cylindrical socket portion in which is fitted a vertically split polyurethane bushing 64a, 64b, having a part spherical internal surface. The bushing is retained by a plate 65 bolted to a flange extending outwardly from the bottom of the cylindrical portion. The bushing 64a, 64b, when assembled, accommodates and retains a ball member 68 which forms the top of a rigid hollow post 69 extending upwardly from an axle 3 and being welded thereto. The ball member 68 has a part spherical machined surface, which has a hard chrome finish, and which is rotatable in the bushing without lubrication.

In operation, the upper and lower torque rod means 4 and 5 form a parallel linkage (when viewed from the side) between the sprung chassis parts and each of the axles 3, thus allowing the axles to move upwards and downwards without significant rotation. Also, the wishbone component forming the upper torque rod means 4 rotates in the sockets 57 about the axis of cross bar 51, giving concomitant linear guided movement of the ball member 68 along the arc of a circle, lateral and longitudinal movement of the ball member 68 being resisted. Fore-and-aft forces on the axle are thus transmitted via post 69 and ball member 68 to the wishbone component and thereby cause radial thrusts on the pads 55 in the sockets 57, whereas lateral forces on the axle cause axial thrust in the cross bar 51, which is taken by the end faces of the bearing pads 55. By reason of the rigidity of the component 4 given by the bracing effect of the cross bar 51, there is no distortion of this component when resisting lateral forces. With this arrangement, the axles 3 can move up and down, and can also tilt about a longitudinal axis coincident with the ball member 68, and the axles are completely located by these torque rod means so that the beams 6 and the spring 7 do not serve any locating function.

FIG. 6 shows a perspective view of a tandem axle suspension system particularly intended for trailers or semi-trailers, which is also shown in side and plan views in FIG. 7 and 8 respectively. This suspension system is preferably attached to a chassis part indicated at 101 which may be formed of longitudinal chassis members or may be in the form of a trolley arranged to be slid underneath the main chassis members of the trailer and detachably secured thereto at different positions, depending on the loads to be carried.

This trailer suspension system comprises basically front and rear tandem axles 103a and 103b respectively, positioned transversely across the chassis part 101, front supporting bracket means in the form of two brackets 102a extending downwardly from the chassis part and spaced in front of the front axle 103a, and rear supporting bracket means in the form of two brackets 102b extending downwardly from the chassis part and spaced behind the rear axle 103b, each of the brackets being rigid in the fore-and-aft direction. The axles are each located by upper and lower torque rod means 104 and 105 respectively, which torque rod means extend outwardly from the axles away from the space between the axles. The suspension system further comprises equalizing or walking beams 106 extending longitudinally and positioned vertically beneath the longitudinal members of the chassis part 101, each of the beams being supported at its ends by the axles 103a, b, and floating with respect to the chassis part, and spring means 107 are interposed between the chassis part and the centre of the beams, these springs being axially compressible and capable of flexure to allow the beams to tilt and follow the vertical movements of the axles.

The upper ends of springs 107 bear against upper plates 116 which lie directly underneath and are welded directly to the longitudinal members of the chassis part 101, which lie directly above the walking beams. The lower ends of the springs 107 bear against plates 127 carried by the flat central portion of the upper flange of the walking beams 106. The nature of the springs 107, and the manner in which these are mounted between the plates 116 and 127, together with the locating means and the rebound stops, are all exactly as described above with reference to the truck suspension system, and so will not be further described. Also, the walking beams 106 and the manner in which they engage the tops of the axle housings 103 are also very similar to those of the truck suspension system previously described, except in that the beams slope downwardly slightly from the central portion, rather than sloping uwpardly.

The upper torque rod means 104 (constituted by wishbone components) and the lower torque rod means 105, are also identical in themselves to the corresponding parts of the truck suspension system described, except in the mounting arrangement for the ends of the lower torque rods remote from the axles. This mounting arrangement is described below. All parts of the wishbone component 104 are the same as the wishbone component 4 described above, and in particular this component includes two members 152 arranged in a V-shaped assembly, the apex of the V-shaped assembly carrying a bearing element in the form of a socket 154 pivotally connected to a rigid upwards extension or post 169 on each axle, the spaced apart ends of the two members being rigidly attached to a cross member 151 extending across the chassis between the spaced apart rod ends, the cross member having bearing pads in the form of end caps 155 bonded to its ends which caps are received in the bearing sockets 157. The torque rod system does however differ from that of the truck suspension system in that the torque rods extend outwardly away from the space between the axles, and the sockets 157 carrying the ends of the wish-bone component are mounted on the brackets 102 which also carry the outer ends of the lower torque rods 105, and which are braced by transverse tubes 109. Further details will now be given of the differences between this trailer suspension and the truck suspension already described.

The layout of the trailer suspension system, in which all the torque rods extend outwardly from the space between the axle housings, is believed to be novel, and is advantageous in that the torque rod system does not have to be accommodated between the relatively closely spaced walking beams, and is generally more accessible. Also, it may be noted that with this arrangement no cross bars or other attachments are required to be attached to the chassis members for supporting the suspension system. This contrasts with the arrangement described in my prior U.S. Pat. No. 3,315,979, in which such cross members are required. The sockets 157 carrying the outer ends of the wishbone component are bolted to the inside faces of the brackets 102 approximately vertically above the attachment points for the lower torque rods, so that the upper and lower torque rod means are substantially parallel when viewed in side elevation and form parallelogram linkages for each axle.

The brackets 102 in this embodiment are also vertically aligned with the lower torque rods 105, so that the manner of attachment of the fixed ends of these rods to the brackets is similar to the connection between these same torque rods and the axles and differs somewhat from the arrangement of the fixed ends of the lower torque rods shown in the truck suspension. As shown in FIG. 9, the inner ends of the torque rod 105 each include a cast end portion 141 having a transverse cast bore of convergent/divergent form, and this bore receives a polyurethane bushing 171 having an outer surface of similar convergent/divergent form, and which can be deformed sufficiently to fit into this bore. The axles 103 have brackets 103' formed with a clevis the sides of which have a transverse bore for receiving a hollow steel pin 175. When a lower torque rod is in place, the pin 175 can be driven into position, and locked in place in the clevis of the bracket by retaining bolts 176. The pin 175 has a machined and hard chrome plated surface, which slides within the bushing 171, the bushing again being impregnated with molybdenum-disulfide so that this bearing does not require any additional lubrication. The resiliency of the polyurethane bushing is such as to allow slight tilting movement of the axles.

The bearings for the outer ends of the lower torque rods are similar to those for the inner ends, as shown in FIG. 9. The three bearings of the wishbone component are all similar to those described with reference to the truck suspension.

In assembling the suspension system, the wishbone component 104 can conveniently be used as a spacer for the brackets 102 before these are welded in place. The component 104 and the brackets 102 are assembled together, with the end caps of the wishbone fitted within the sockets 157 which are bolted in place, and the two brackets are held in place on the wishbone component by clamps while the assembly is lowered onto an inverted chassis part on which it is to be welded. The springs, walking beams, axles, and lower torque rods are fitted subsequently. The assembly of the end caps of the wishbone is extremely simple since these caps are simply slid into the sockets 157.

The operation of the torque rod assembly is identical to that described with reference to the truck suspension, this torque rod assembly again locating the axles longitudinally and laterally, while the walking beams are floating with respect to both the chassis part 102 and the axle housings and serve merely to transmit vertical loads to the chassis.

FIG. 10 shows a further example of the use of a wishbone component, in a single axle suspension system. This includes an arrangement of brackets 202 and a single axle 203 connected to the brackets 202 by torque rod means including lower torque rods 205 and an upper wishbone component 204. All these parts are identical to corresponding parts of the trailer suspension described. The axle 203 has welded thereto flat upper plates 227, one at each side of the chassis, and rubber springs 207 are interposed between these plates and similar plates 216 connected by structural members 217 to the chassis beams 201.

FIG. 10 shows in more detail the springs 207 and mounting means.

The springs 207 are generally cylindrical blocks of elastomeric material, preferably natural rubber, having a vertical axis, and having a central cavity the shape of which is indicated in FIG. 10 and which extends to outlets at each end of the spring. The springs 207 are located in position between the plates 216 and 227 by two short tubular spigots 228 extending inwardly from each plate into outlet ends of the cavity in the spring. The interior of the upper tubular spigot is vented as at 229 to atmosphere so that as the spring is successively compressed and expanded air is pumped in and out of the central cavity of the spring through the spigot. This flow of air prevents undesirable heating of the rubber spring, which would otherwise occur due to its energy absorbing characteristics. Also, the vent 229 is sufficiently small to restrict the rate of pumping of air, providing auxiliary damping of the spring. Rebound stops 232 are provided in the form of two bolts 233 carrying rubber bungs 232 between their upper ends and plate 216.

I claim:

1. A linkage component for guiding an unsprung part of a vehicle suspension system in linear movement relative to a sprung chassis part, said component comprising a rigid frame connecting three spaced apart bearing elements, said bearing elements including two co-axial bearing elements non-rotatably held on said frame and having oppositely facing bearing surfaces, said elements being arranged so as to resist axial thrust and radial forces when located by bearing means of complementary shape having opposed bearing surfaces spaced a fixed distance apart, said bearing elements also including a third bearing element spaced from an axis joining said co-axial elements, whereby said component is capable of being located with its co-axial elements held in opposed bearing means carried by one of said parts in such manner as to allow angular movement of the component about said axis with concomitant linear guided movement of further bearing means located by said third bearing element and carried by the other said part.

2. A linkage component according to claim 1, wherein each of said co-axial bearing elements and the associated bearing means are arranged to resist axial thrust in one direction only, whereby the bearing elements and bearing means can be assembled by a simple sliding motion.

3. A linkage component according to claim 1, wherein said bearing elements are constituted by end caps fitted onto end portions of the said rigid frame.

4. A linkage component according to claim 3, wherein said rigid frame comprises a stiff axial elongated member extending along said axis, the ends of which member carry said bearing pads, and said frame also comprises two further stiff elongated members each having an inner end connected to said third bearing element and having their outer ends connected to the axial member at spaced apart locations, so that said members form a triangulated structure.

5. A triangulated wishbone component for guiding an unsprung part of a vehicle suspension system in linear movement relative to a sprung chassis part, said component comprising a stiff axial elongated member and two further stiff elongated members having their outer ends fixed to said axial member and forming a triangulated structure therewith, said component further comprising bearing pads in the form of end caps having sockets fitted non-rotatably onto the ends of the axial member, said bearing pads having oppositely disposed, outwardly facing co-axial bearing surfaces said surfaces of each pad being orientated so as to resist axial thrust and radial forces when fitted within a bearing socket of complementary shape, said two further elongated members carrying at their inner ends a third bearing element spaced from the axial member, whereby said component is capable of being located with its bearing pads held in opposed bearing sockets carried by one of said parts in such manner as to allow angular movment of the component about said axis with concomitant linear guided movement of bearing means located by said third bearing element and carried by said other part.

6. A wishbone component according to claim 5, wherein said bearing pads are cup shaped elements of polyurethane, bonded over the ends of said axial member.

7. A wishbone component according to claim 5, combined with socket members co-acting with the said end caps, said socket members having bearing surfaces in contact with the bearing surfaces of the end caps and also having bolt holes for attachment to chassis members or to brackets attachable to a chassis.

8. A torque rod assembly for locating a vehicle axle comprising a pair of brackets for attachment to a vehicle chassis part, a pair of lower torque rods each flexibly connected at one end to the lower ends of one of said brackets and connectable to an axle at the other end, and upper torque rod means constituted by a linkage component comprising a rigid frame connecting three spaced apart bearing elements, said bearing elements including two co-axial oppositely disposed bearing elements non-rotatably held on said frame and having opposed outwardly facing bearing surfaces, two bearing means mounted on the inside of said brackets and each dimensioned to rotatably receive one of said co-axial elements, said surfaces of each co-axial element being orientated so as to resist outwards axial thrust and radial forces when mounted in the respective bearing means said bearing elements also including a third bearing element spaced from an axis joining said co-axial elements and arranged for engagement with co-acting further bearing means carried by a rigid upward extension on said axle, whereby said upper and lower torque rod means form a parallelogram type linkage capable of guiding the axle in vertical movement, the said linkage component also locating the axle laterally.

9. A torque rod assembly according to claim 8 wherein said linkage component comprises a stiff elongated member extending between said co-axial elements the ends of which member carry said co-axial elements and wherein said frame also comprises two further elongated members each having an inner end connected to said third bearing element and having their outer ends connected to said axial member at spaced apart locations, so that said members form a triangulated structure.

10. A tandem axle suspension system for load carrying vehicles including a load carrying chassis part, front and rear tandem axles positioned transversely across the chassis part, a pair of front brackets extending downwardly from said chassis part and spaced in front of said front axle and a pair of rear brackets extending downwardly from said chassis part and spaced behind said rear axle, said axles each being located by upper and lower torque rod means extending between each axle and the adjacent pair of brackets, said lower torque rod means each having an inner end flexibly connected to one of said axles and having an outer end flexibly connected to the lower part of one of said pair of brackets adjacent the respective axle, each of said axles being provided with a rigid upwards extension, said upper torque rod means being vertically spaced above said lower torque rod means and flexibly joined between the said upwards extension and upper parts of said pair of brackets adjacent the axle, said upper torque rod means each being constituted by a linkage component comprising a rigid frame connecting three spaced apart bearing elements, said bearing elements including two co-axial oppositely disposed bearing pads non-rotatably held on said frame and having opposed outwardly facing bearing surfaces, two sockets mounted on the insides of said brackets, and each dimensioned to rotatably receive one of said bearing pads, said surfaces of each pad being oriented so as to resist outwards axial thrust and radial forces when mounted in the respective socket, said bearing elements also including a third bearing element spaced from an axis joining said bearing pads and engaging co-acting bearing means carried by said rigid upwards extendion of the adjacent axle whereby said torque rod means resist transverse, longitudinal, and torsional loads applied to said axles while allowing relatively free up and down movements of the axles without substantial rotation about the housing axes, said system further comprising equalizing beam means extending longitudinally on each side of the chassis part, each of said equalizing beam means being supported at its ends by said axles and floating with respect to said chassis part, and spring means interposed between said chassis part and said equalizing beam means, said spring means being axially compressible and capable of flexure to permit said beams to tilt and follow the vertical movements of said axles.

11. A tandem axle suspension system for load carrying vehicles including a load carrying chassis part, front and rear tandem axles positioned transversely across said chassis part, front supporting bracket means extending downwardly from said chassis part and spaced in front of said front axle and rear supporting frame means extending downwardly from the chassis part and spaced behind said rear axle, each of said supporting bracket means being rigid in the fore and aft direction, said axle housings each being located by upper and lower torque rod means, said lower torque rod means each having an inner end flexibly connected to one of said axles and an outer end flexibly connected to the lower end of the supporting bracket means adjacent the respective axle, each of said axles being provided with a rigid upwards extension, and upper torque rod means flexibly joined at one end thereof to one of said upward extensions and being flexibly joined at the other end to a point which is fixed in relation to said chassis part, one of said torque rod means for each axle being designed to resist transverse forces applied to said axles, the arrangement of torque rods for each axle being such as to resist transverse, longitudinal, and torsional loads imposed on said axles while allowing relatively free up and down movements of the axles without substantial rotation about the axle axes, said system further comprising equalizing beam means extending longitudinally on each side of the chassis part, each of said equalizing beam means being supported at its end by said axles and floating with respect to said chassis part, and spring means interposed between said chassis part and said equalizing beam means, said spring means being axially compressible and capable of flexure to permit said beams to tilt and rise.

12. The tandem axle suspension system of claim 11, wherein said upper torque rod means each extends from said respective axle to a point on the chassis in approximately vertical alignment with the point of connection of the respective lower torque rod means to the said lower ends of the supporting bracket means, wherein said upper and lower torque rod means are substantially parallel when viewed in side elevation and form parallelogram linkages for each axle extending beyond the ends of the equalizing beam means.

13. The tandem axle suspension system of claim 12, wherein said supporting bracket means each comprise two brackets extending downwardly from the sides of the chassis part, and wherein each said upper torque means extends between said upwards extension on the respective axle and mounting means carried by said brackets.

14. A vehicle suspension system including spring means of elastomeric material each having a central cavity communicating with an outlet at one end of the spring means, said spring means being mounted by means including a tubular spigot extending into said outlet, said spigot allowing for passage of air between said cavity and the atmosphere whereby air moves in and out of said cavity with compression and expansion of the spring.

* * * * *

UNITED STATES PATENT OFFICE
CERTIFICATE OF CORRECTION

Patent No. 3,792,871  Dated February 19, 1974

Inventor(s) Wallace G. Chalmers

It is certified that error appears in the above-identified patent and that said Letters Patent are hereby corrected as shown below:

Claim 1. A linkage component for guiding an unsprung part of a vehicle suspension system in linear movement relative to a sprung chassis part, said component comprising a rigid frame including a stiff elongated member carrying at is ends two bearing elements non-rotatably held on said member and co-axial therewith and having bearing surfaces which include both radially extending surfaces facing wholly outwardly from the ends of the member and axially extending surfaces, whereby each of said elements is capable of resisting unidirectional axial thrust and radial forces when located by bearing means of complementary shape having opposed bearing surfaces spaced a fixed distance apart, said frame also carrying a third bearing element spaced from the axis of said member, whereby said component is capable of being located

UNITED STATES PATENT OFFICE
CERTIFICATE OF CORRECTION

Patent No. 3,792,871                     Dated February 19, 1974

Inventor(s)         Wallace G. Chalmers          PAGE - 2

It is certified that error appears in the above-identified patent and that said Letters Patent are hereby corrected as shown below:

with its co-axial elements held in opposed bearing means carried by one of said parts in such manner as to allow angular movement of the component about the axis of said member with concommitant linear guided movement of further bearing means located by said third bearing element and carried by the other said part.

Claim 2.  A suspension system for vehicles including a linkage component in accordance with Claim 1, and wherein said bearing means of complementary shape which locate said co-axial bearing elements are arranged to resist axial thrust in one direction only, whereby the bearing elements and bearing means can be assembled by a simple sliding motion.

Claim 3.  A linkage component according to Claim 1, wherein said bearing elements are constituted by end caps fitted onto the ends of said elongated member, said

UNITED STATES PATENT OFFICE
CERTIFICATE OF CORRECTION

Patent No. 3,792,871     Dated February 19, 1974

Inventor(s) Wallace G. Chalmers     Page - 3

It is certified that error appears in the above-identified patent and that said Letters Patent are hereby corrected as shown below:

caps having end faces forming the outer extramities of said linkage component and having axially extending surfaces surrounding the end portions of said member.

Claim 4. A linkage component according to Claim 1, wherein said frame also comprises two further stiff elongated members each having an inner end connected to said third bearing element and having their outer ends connected to the axial member at spaced apart locations, so that said members form a triangulated structure.

Signed and sealed this 5th day of November 1974.

(SEAL)
Attest:

McCOY M. GIBSON JR.
Attesting Officer

C. MARSHALL DANN
Commissioner of Patents